(12) United States Patent
Starkweather

(10) Patent No.: US 6,906,860 B2
(45) Date of Patent: *Jun. 14, 2005

(54) CURVED-SCREEN IMMERSIVE REAR PROJECTION DISPLAY

(75) Inventor: Gary K. Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,251

(22) Filed: Jul. 6, 2004

(65) Prior Publication Data

US 2004/0239890 A1 Dec. 2, 2004

Related U.S. Application Data

(63) Continuation of application No. 10/161,401, filed on May 31, 2002, now Pat. No. 6,813,074.

(51) Int. Cl.$^7$ .................. G03B 21/56; G03B 21/60; H04N 7/12; H04N 11/04
(52) U.S. Cl. .................. 359/451; 359/453; 359/460; 348/389.1; 348/445
(58) Field of Search .................. 359/451, 453, 359/460, 443; 348/389.1, 445

(56) References Cited

U.S. PATENT DOCUMENTS

| | | | |
|---|---|---|---|
| 5,619,255 A | | 4/1997 | Booth .................. 348/36 |
| 6,034,717 A | | 3/2000 | Dentinger et al. .......... 348/51 |
| 6,141,034 A | * | 10/2000 | McCutchen .................. 348/36 |
| 6,265,836 B1 | | 7/2001 | Aoki .................. 315/370 |
| 6,347,012 B1 | | 2/2002 | Monson et al. ............. 359/451 |

* cited by examiner

*Primary Examiner*—Rodney Fuller
*Assistant Examiner*—Magda Cruz
(74) *Attorney, Agent, or Firm*—Woodcock Washburn LLP

(57) ABSTRACT

The present invention provides an immersive rear projection display capable of providing aspect ratios of 2.66:1 or 4:1, or even greater. This allows viewers to be "immersed" in the images being displayed because the images can encompass both the direct and the peripheral views of a viewer. In one implementation, the immersive rear projection display includes two or more electronic projectors (e.g., three) that are positioned behind a curved translucent display screen. The electronic projectors project respective display images adjacent each other onto the display screen.

29 Claims, 4 Drawing Sheets

CURVED-SCREEN IMMERSIVE REAR PROJECTION DISPLAY

CROSS REFERENCE TO RELATED APPLICATIONS

This application is a continuation of U.S. patent application Ser. No. 10/161,401, filed May 31, 2001, now U.S. Pat. No. 6,813,074, which is incorporated herein by reference in its entirety.

FIELD OF THE INVENTION

The present invention relates to rear projection displays and, in particular, to an immersive rear projection display that includes a curved display screen.

BACKGROUND OF THE INVENTION

Standard computer-related and television displays have width-to-height aspect ratios of 1.33:1. The greater relative width of standard displays accommodates in part the relatively greater horizontal field of view of human vision. However, the relative horizontal field of view of human vision is significantly greater than the 1.33:1 aspect ratio of standard displays. As a consequence, a variety of display formats have been developed to better accommodate the relatively greater horizontal field of view of human vision. For example, high-definition television (HDTV) displays are characterized by aspect ratios of 16:9 (i.e., about 1.78:1), and the wide-screen cinematic displays such as Cinemascope® and Super Panavision© have aspect ratios of 2.35:1 and 2.55:1, respectively.

Some electronic- or computer-based display systems project a display image onto a display screen for viewing by typically multiple viewers. These display systems employ an electronic or multimedia optical projector that may use liquid crystal cells, digital micro-mirrors, etc. to form a display image that is projected onto a display screen. Such electronic projectors are available under a variety of trademarks including Sony®, Hitachi®, Sharp®, In Focus®, Epson®, etc. In some implementations, the electronic projector is positioned in front of a reflective display screen (i.e., on the same side of the screen as the viewer). In other implementations, the electronic projector is positioned behind a translucent display screen (i.e., on the opposite side of the screen relative to the viewer). Conventional electronic projectors provide display images with the standard 1.33:1 aspect ratio.

SUMMARY OF THE INVENTION

The present invention provides an immersive rear projection display capable of providing aspect ratios of 2.66:1 or 4:1, or even greater. This allows viewers to be immersed in the images being displayed because they can encompass both the direct and the peripheral views of a viewer. In one implementation, the immersive rear projection display includes two or more electronic projectors (e.g., three) that are positioned behind a curved translucent display screen. The electronic projectors project respective display images adjacent each other onto the display screen.

The display screen may be curved laterally about a vertical axis and may reduce or eliminates perspective distortion that can otherwise occur at the edges of a flat screen. The display screen may be formed as a generally continuous curve with substantially no discontinuities in the curvature. In some implementations, the display may include pincushion distortion-compensating optical elements in association with the electronic projectors to compensate for pincushion distortion arising from projection of display images onto the curved display screen. Another aspect of this invention is that it may be implemented as a large-scale display for multiple viewers or in association with a desktop workspace that is configured and sized for viewing generally by only one viewer.

Additional objects and advantages of the present invention will be apparent from the detailed description of the preferred embodiment thereof, which proceeds with reference to the accompanying drawings.

DETAILED DESCRIPTION OF ILLUSTRATIVE EMBODIMENTS

Figure 1:
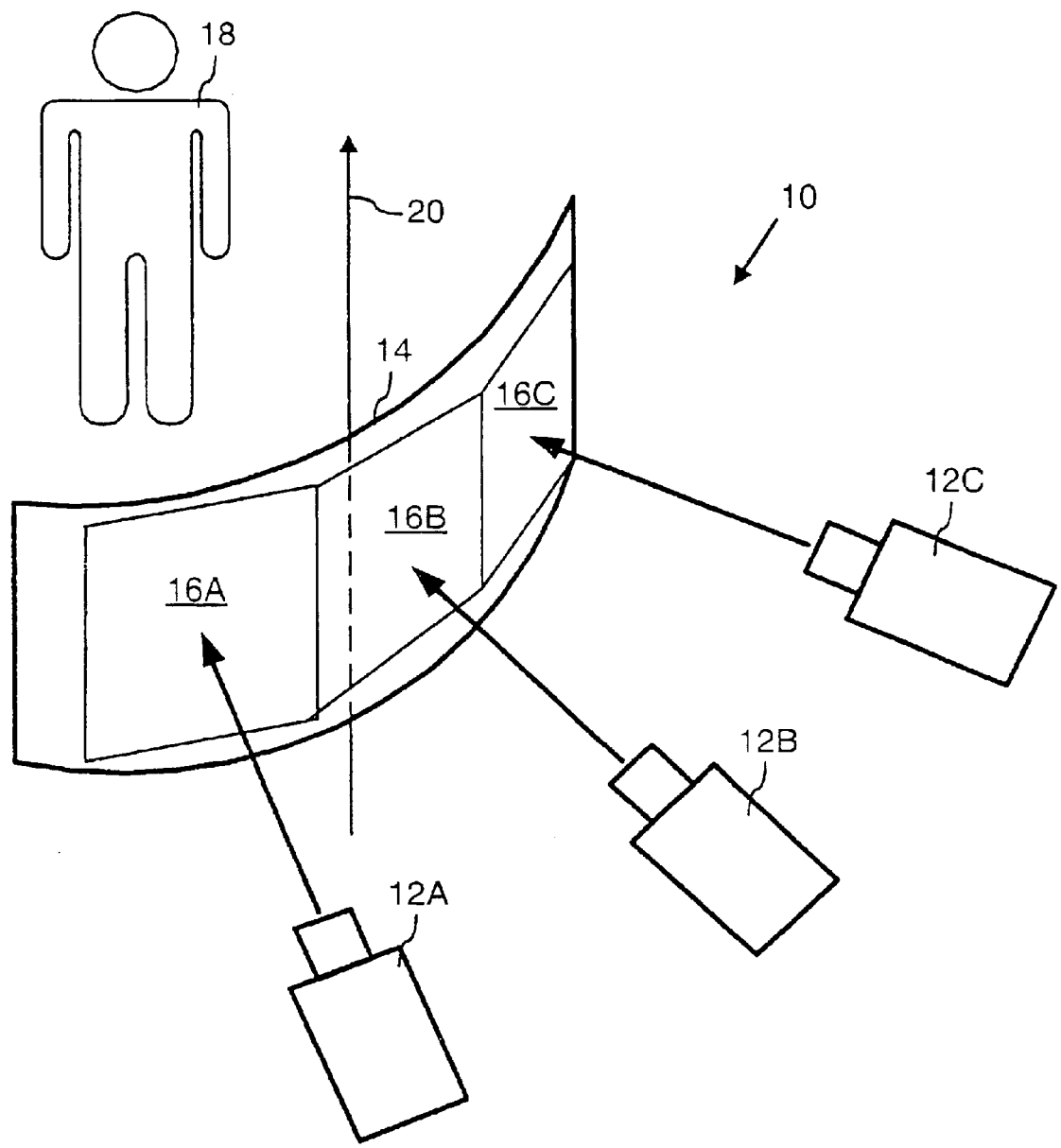
FIG. 1 is a diagrammatic illustration of a curved-screen immersive rear projection display.

FIG. 1 is a diagrammatic rear illustration of a curved-screen immersive rear projection display 10 having three electronic projectors 12A, 12B, and 12C, which are collectively referred to as electronic projectors 12 and are positioned behind a curved translucent display screen 14. Electronic projectors 12 are well-known in the art and may employ any of a variety of electronically-controlled display technologies including liquid crystal displays, digital micro-mirrors (e.g., DIP™ digital light processing light controllers available from Texas Instruments Incorporated), etc., together with appropriate projection optics.

It will be appreciated that immersive rear projection display 10 may include any number of two or more projectors 12. The illustrated implementation with three electronic projectors 12A, 12B, and 12C is merely exemplary. Electronic projectors 12 may be enclosed by a cabinet (not shown) that also supports display screen 14 about its periphery.

Electronic projectors 12A, 12B, and 12C project respective display images 16A, 16B, and 16C on a rear surface of display screen 14 for viewing by one or more viewers 18 (one shown schematically) positioned in front of display screen 14. Display images 16A, 16B, and 16C may be adjacent segments of a single integrated display image, such as a wide-angle panoramic scene or an extended-width table, or may be separate, generally distinct display images. Display images 16A, 16B, and 16C of respective electronic projectors 12A, 12B, and 12C may correspond to the separate virtual desktops of a multi-monitor configuration that can be provided by various Windows®-brand operating systems, as well as various virtual desktop software utilities for graphical user interfaces.

Curved display screen 14 includes a laterally concave shape relative to viewer 18 and may be formed relative to a vertical axis 20. In one implementation, curved display screen 14 is formed as a generally continuous curve with substantially no discontinuities in the curvature. Also, curved display screen 14 may be formed with a generally consistent radius of curvature (i.e., generally as a circular segment), or without a generally consistent radius of curvature. Curved display screen 14 may be formed of any translucent material, but in one prototype implementation is formed of drawing vellum.

The display images 16 formed by electronic projectors 12 may each include a conventional projection display aspect ratio of about 1.33:1 (width-to-height). As a result, the three electronic projectors 12A, 12B, and 12C form on curved display screen 14 a combined display image with an aspect ratio of about 4:1. Similarly, an implementation of immersive rear projection display 10 with only two electronic projectors 12 a combined display image with an aspect ratio of about 2.66:1.

Aspect ratios of 2.66:1, or 4:1, or even greater, as provided by the present invention, are greater than the aspect ratios of conventional displays. For example, standard computer-related and television displays have aspect ratios of 1.33:1 and high-definition television (HDTV) displays are characterized by aspect ratios of 16:9 (i.e., about 1.78:1). In addition, wide-screen cinematic displays such as Cinemascope® and Super Panavision® have aspect ratios of 2.35:1 and 2.55:1, respectively.

Accordingly, the wider aspect ratios that can be provided by the present invention provide a display that can encompass a wide degree of peripheral vision of viewer 18, thereby giving viewer 18 an impression of being immersed in the displayed image. While viewer 18 may be able to give direct attention to only the portion of the display screen 14 in the direct field of view, viewer 18 may rapidly and conveniently re-direct the field of view to other portions of display screen 14. The lateral curvature of display screen 14 enhances the impression of viewer immersion and reduces or eliminates perspective distortion that can otherwise occur at the edges of a flat screen.

Figure 2:
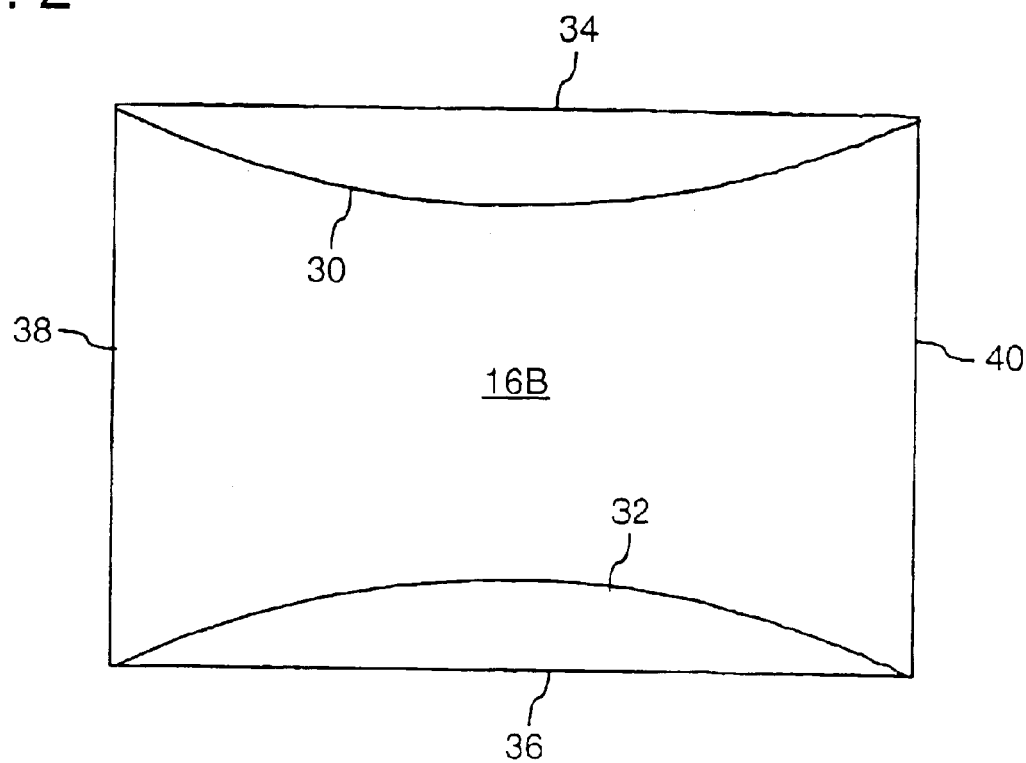
FIG. 2 is a front view of a display image rendered on a curved display screen by an electronic projector with conventional flat-screen projection optics.

FIG. 2 is a front view, as observed by viewer 18, of a display image 16B rendered on curved display screen 14 by an electronic projector 12 with conventional flat-screen projection optics. The following description is made with reference to display image 16B as an example, but is similarly applicable to any other display image 16.

Display image 16B illustrates pincushion distortion effects 30 and 32 (exaggerated for clarity) that can occur along respective top edge 34 and bottom edge 36 due to the lateral curvature of display screen 14 in combination with conventional flat screen projection optics. Pincushion distortion effects do not occur along lateral edges 38 and 40 of display image 16B in the absence of a vertical curvature in display screen 14.

It will be appreciated that pincushion-corrected optical elements could be incorporated into electronic projectors 12 to compensate for and substantially reduce pincushion distortion effects 30 and 32. In particular, appropriate compensating barrel distortion may be incorporated into the optical elements of electronic projectors 12.

Figure 3:
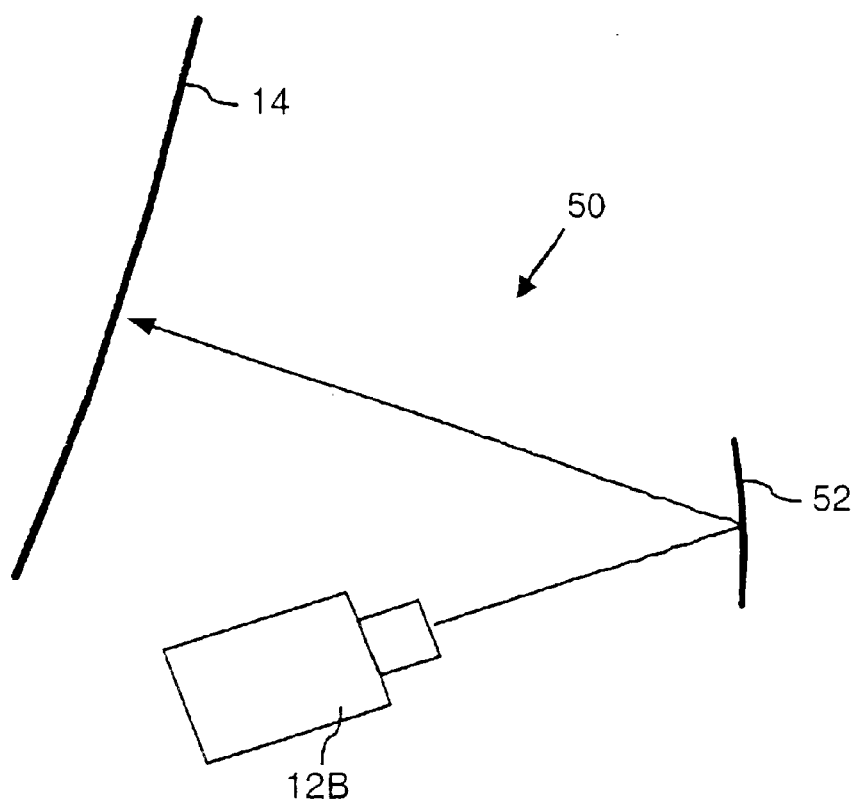
FIG. 3 is a schematic plan view of one implementation of a distortion-corrected optical path for an electronic projector directing a display image to display screen.

FIG. 3 is a schematic plan view of one implementation of a distortion-corrected optical path 50 for electronic projector 12B directing a display image to display screen 14. The following description is made with reference to electronic projector 12B as an example, but is similarly applicable to other electronic projectors 12.

Optical path 50 includes a curved, concave reflector 52 positioned to receive a projected image from electronic projector 12B and reflect the projected image onto display screen 14. Concave reflector 52 may have a parabolic, toroidal, or a spherical curvature. While a toroidal curvature could best compensate pincushion distortion effects 30 and 32, a spherical or parabolic curvature would provide adequate compensation at a significantly reduced cost. In one simplified implementation, a conventional amateur astronomical mirror with a diameter of 10 inches or less may function as concave reflector 52.

Figure 4:
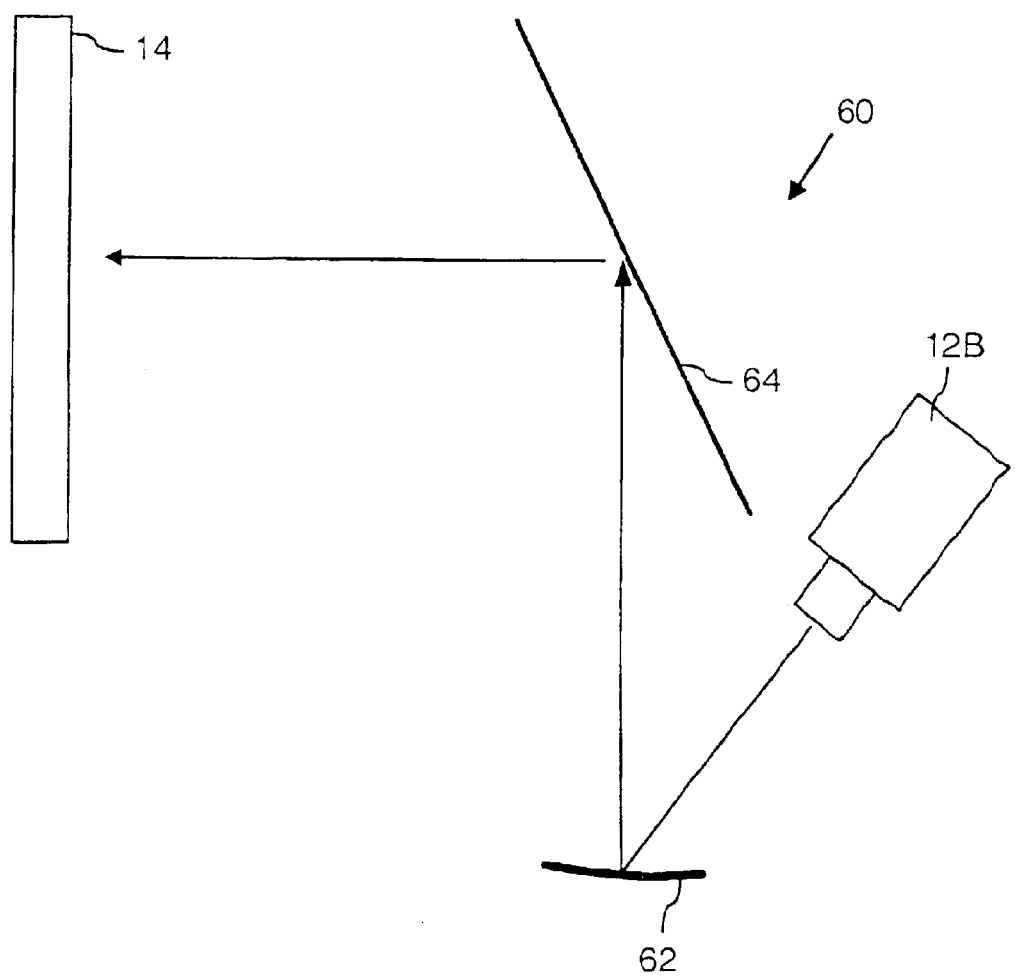
FIG. 4 is a schematic plan view of another implementation of a distortion-corrected optical path for an electronic projector directing a display image to display screen.

FIG. 4 is a schematic side view of one implementation of a distortion-corrected optical path 60 for electronic projector 12B directing a display image to display screen 14. The following description is made with reference to electronic projector 12B as an example, but is similarly applicable to other electronic projectors 12.

Distortion-corrected optical path 60 is analogous to distortion-corrected optical path 50 and includes a curved, concave reflector 62 positioned to receive a projected image from electronic projector 12B and reflect the projected image onto display screen 14 via a flat fold mirror 64. Distortion-corrected optical path 60 with flat fold mirror 64 allow optical path 60 to be folded and more compact than a comparable distortion-corrected optical path 50.

Figure 5:
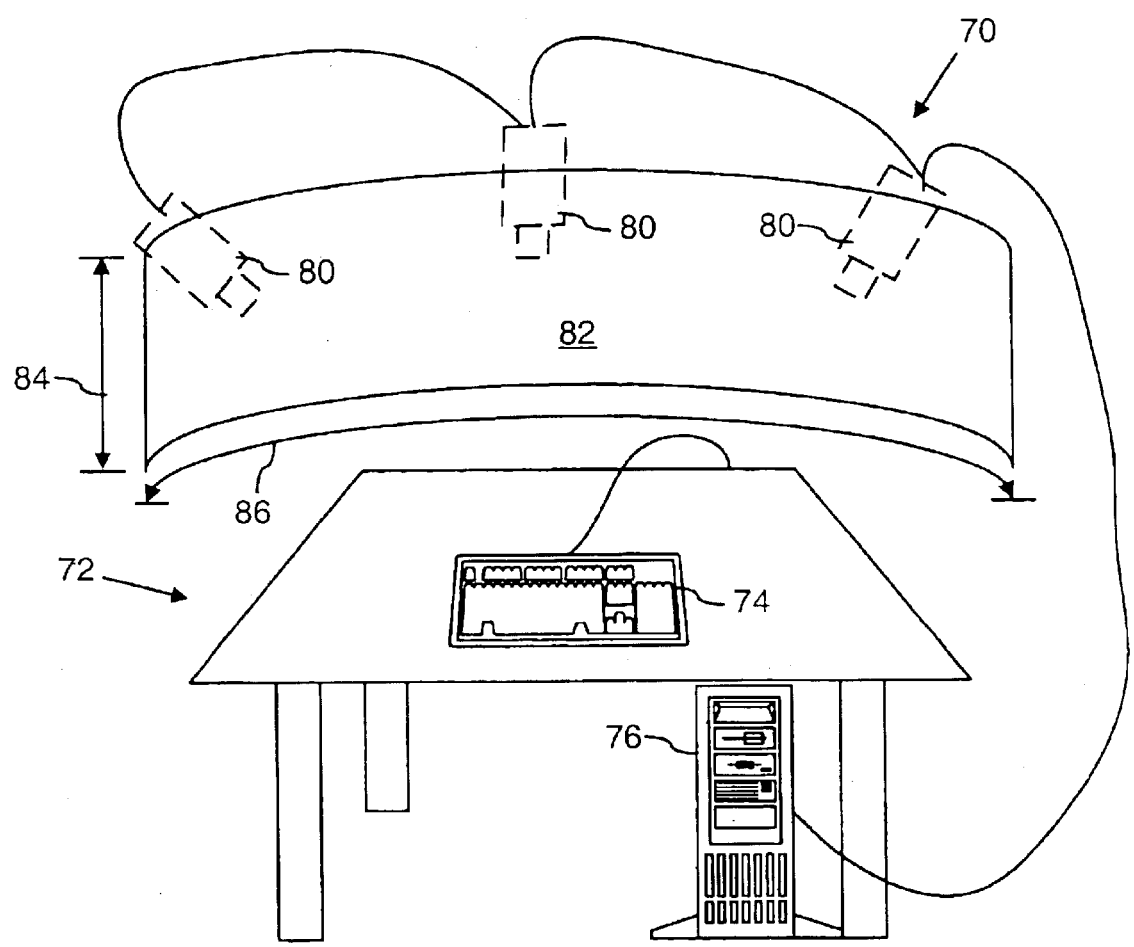
FIG. 5 is a front view illustration of a computer workstation curved-screen immersive rear projection display.

FIG. 5 is a front view illustration of a computer workstation curved-screen immersive rear projection display 70 that includes a computer workstation 72 having at least one computer input device 74 in communication with a computer 76. Although illustrated as being local to workstation 72, computer 76 may alternatively be located remotely.

Multiple (e.g., three) electronic projectors 80 are positioned behind a curved translucent display screen 82 and are in communication with computer 76 to receive display image signals from which to project respective computer display images adjacent each other onto display screen 82. Display screen 82 may be formed with a radius of curvature of about 34 inches (86 cm) and may have a height 84 of 12 inches (30 cm) and a length 86 of 48 inches (120 cm).

Having described and illustrated the principles of the invention with reference to an illustrated embodiment, it will be recognized that the illustrated embodiment can be modified in arrangement and detail without departing from such principles. In view of the many possible embodiments to which the principles of the invention may be applied, it should be recognized that the detailed embodiments are illustrative only and should not be taken as limiting the scope of our invention. All such embodiments may come within the scope and spirit of the following claims and equivalents thereto.

What is claimed:

1. A curved-screen rear projection display, comprising:
   a curved translucent display screen;
   plural electronic projectors positioned behind the display screen to project respective display images adjacent each other onto the display screen; and
   pincushion distortion-compensating optical elements in association with the electronic projectors to compensate for pincushion distortion arising from projection of display images onto the curved display screen.

2. The display of claim 1 in which the display screen has an aspect ratio of at least 2.66:1 for width-to-height.

3. The display of claim 1 in which the display screen has an aspect ratio of at least 4:1 for width-to-height.

4. The display of claim 1 in which the display screen is formed as a generally continuous curve with substantially no discontinuities in the curvature.

5. The display of claim 1 in which the display screen is curved laterally about a vertical axis.

6. The display of claim 1 in which the display screen is associated with a desktop workspace and is sized for viewing generally by only one viewer.

7. A computer workstation curved-screen rear projection display, comprising:

a computer workstation having at least one computer input device in communication with a computer;

a curved translucent display screen;

plural electronic projectors positioned behind the display screen and in communication with the computer to project respective computer display images adjacent each other onto the display screen; and pincushion distortion compensating optical elements in association with the electronic projectors to compensate for pincushion distortion arising from projection of display images onto the curved display screen.

8. The display of claim 7 in which the display screen has an aspectration of at least 2.66:1 for width-to-height.

9. The display of claim 7 in which the display screen has an aspectration of at least 4:1 for width-to-height.

10. The display of claim 7 in which the display screen is formed as a generally continuous curve with substantially no discontinuities in the curvature.

11. The display of claim 7 in which the display screen is curved laterally about a vertical axis.

12. A curved-screen rear projection display, comprising:

a curved translucent display screen having an aspect ratio of at least 4:1 for width to height; and plural electronic projectors positioned behind the display screen to project respective display images adjacent each other onto the display screen.

13. The display of claim 12 in which the display screen is formed as a generally continuous curve with substantially no discontinuities in the curvature.

14. The display of claim 12 further comprising pincushion distortion-compensating optical elements in association with the electronic projectors to compensate for pincushion distortion arising from projection of display images onto the curved display screen.

15. The display of claim 14 in which the pincushion distortion-compensating optical elements further comprise curved reflectors positioned in optical paths between the electronic projectors and the curved display screen.

16. The display of claim 12 in which the display screen is curved laterally about a vertical axis.

17. The display of claim 12 in which the display screen is associated with a desktop workspace and is configured and sized for viewing generally by only one viewer.

18. A computer workstation curved-screen rear projection display, comprising:

a computer workstation having at least one computer input device in communication with a computer;

a curved translucent display screen having an aspect ratio of at least 4:1 for width-to-height; and plural electronic projectors positioned behind the display screen and in communication with the computer to project respective computer display images adjacent each other onto the display screen.

19. The display of claim 18 in which the display screen is formed as a generally continuous curve with substantially no discontinuities in the curvature.

20. The display of claim 18 in which the display screen is curved laterally about a vertical axis.

21. The display of claim 18, further comprising pincushion distortion-compensating optical elements in association with the electronic projectors to compensate for pincushion distortion arising from projection of display images onto the curved display screen.

22. The display of claim 21, in which the pincushion distortion-compensating optical elements further comprise curved reflectors positioned in optical paths between the electronic projectors and the curved display screen.

23. A curved-screen immersive rear projection display method, comprising:

providing display image signals corresponding to plural adjacent display image segments to plural respective rear-projection electronic projectors;

projecting the plural display images from the plural electronic projectors onto a rear surface of a curved translucent display screen; and providing pincushion distortion compensation in association with the electronic projectors to compensate for pincushion distortion arising from the projection of display images onto the curved display screen.

24. The method of claim 23 further comprising providing the display image signals from a computer.

25. The method of claim 23 in which the display screen has an aspect ratio of at least 2.66:1 for width-to-height.

26. The method of claim 23 in which the display screen has an aspect ratio of at least 4:1 for width to height.

27. The method of claim 23 in which the display screen is formed as a generally continuous curve with substantially no discontinuities in the curvature.

28. The method of claim 23 in which the display screen is curved only laterally about a vertical axis.

29. The method of claim 23 in which the display screen is associated with a desktop workspace and is configured and sized for viewing generally by only one viewer.

* * * * *